Aug. 7, 1923.
D. L. PENROD
1,464,293
AMALGAMATING MILL
Filed April 28, 1922  4 Sheets-Sheet 4
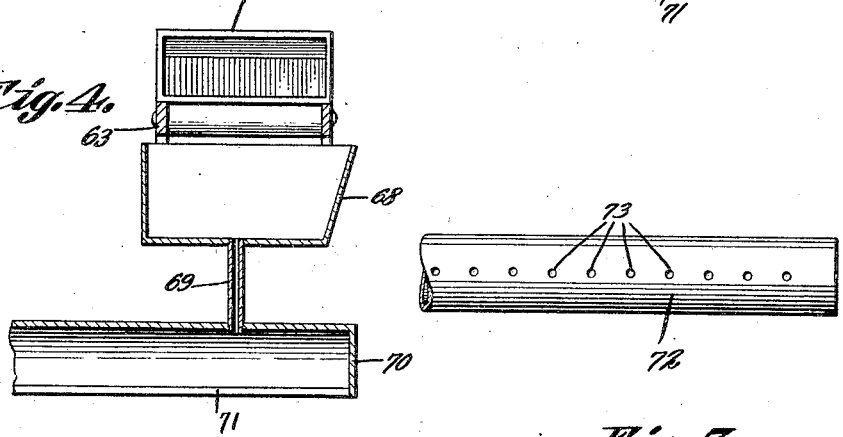
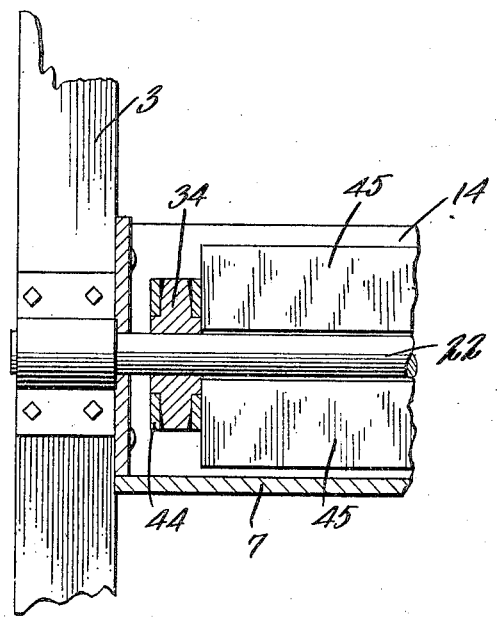
Inventor,
D. L. Penrod.
By C. A. Snow & Co.
Attorneys Patented Aug. 7, 1923.

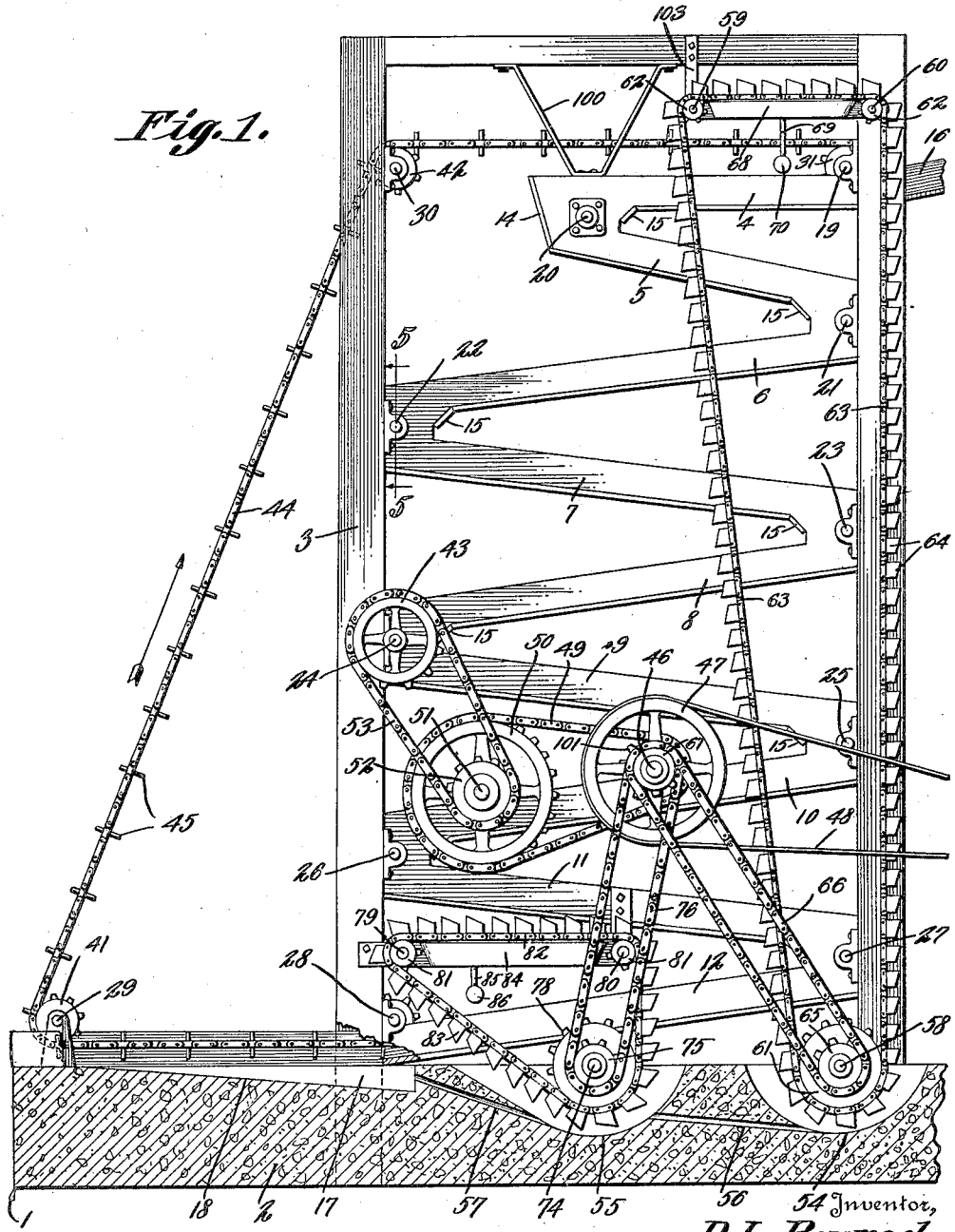

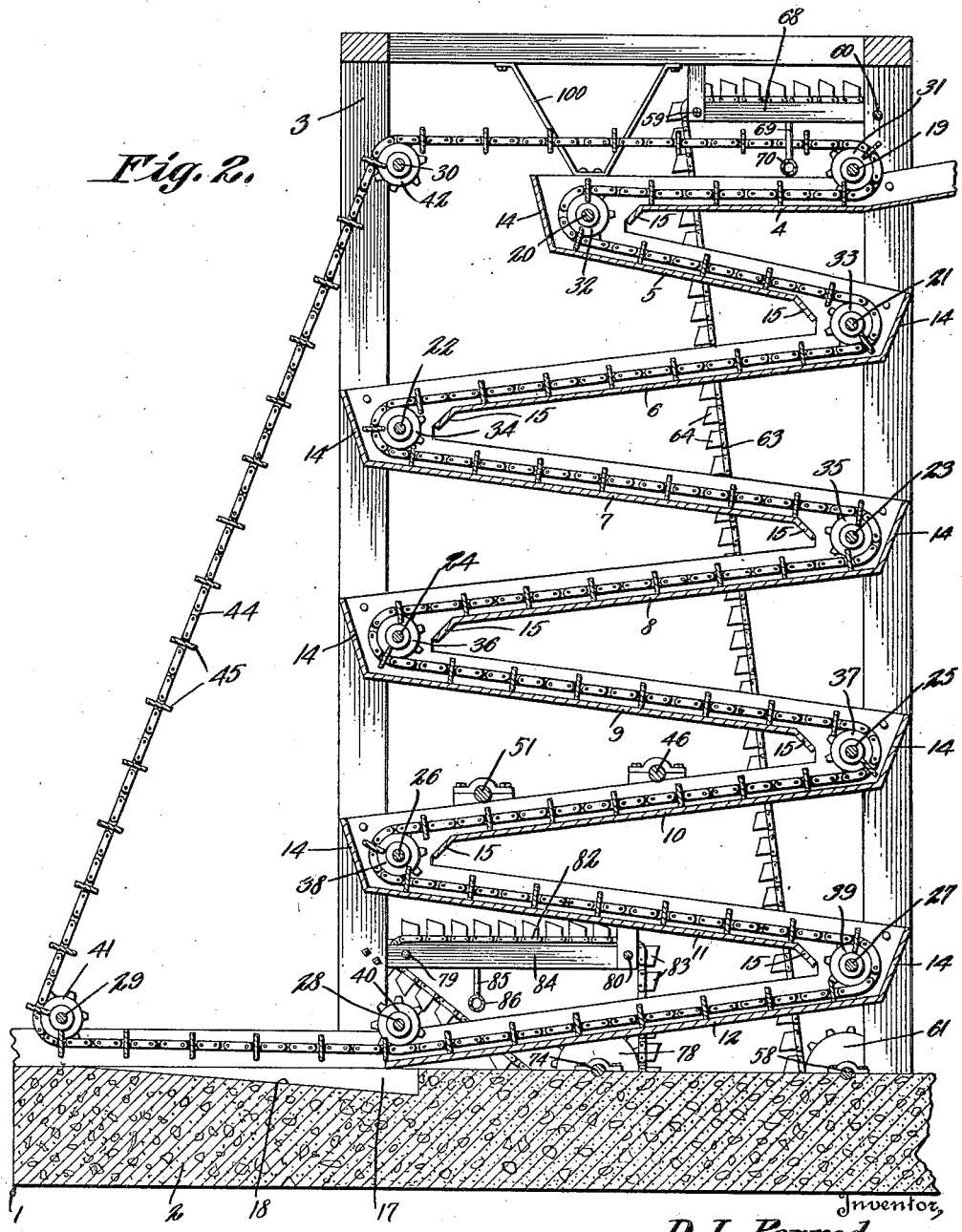

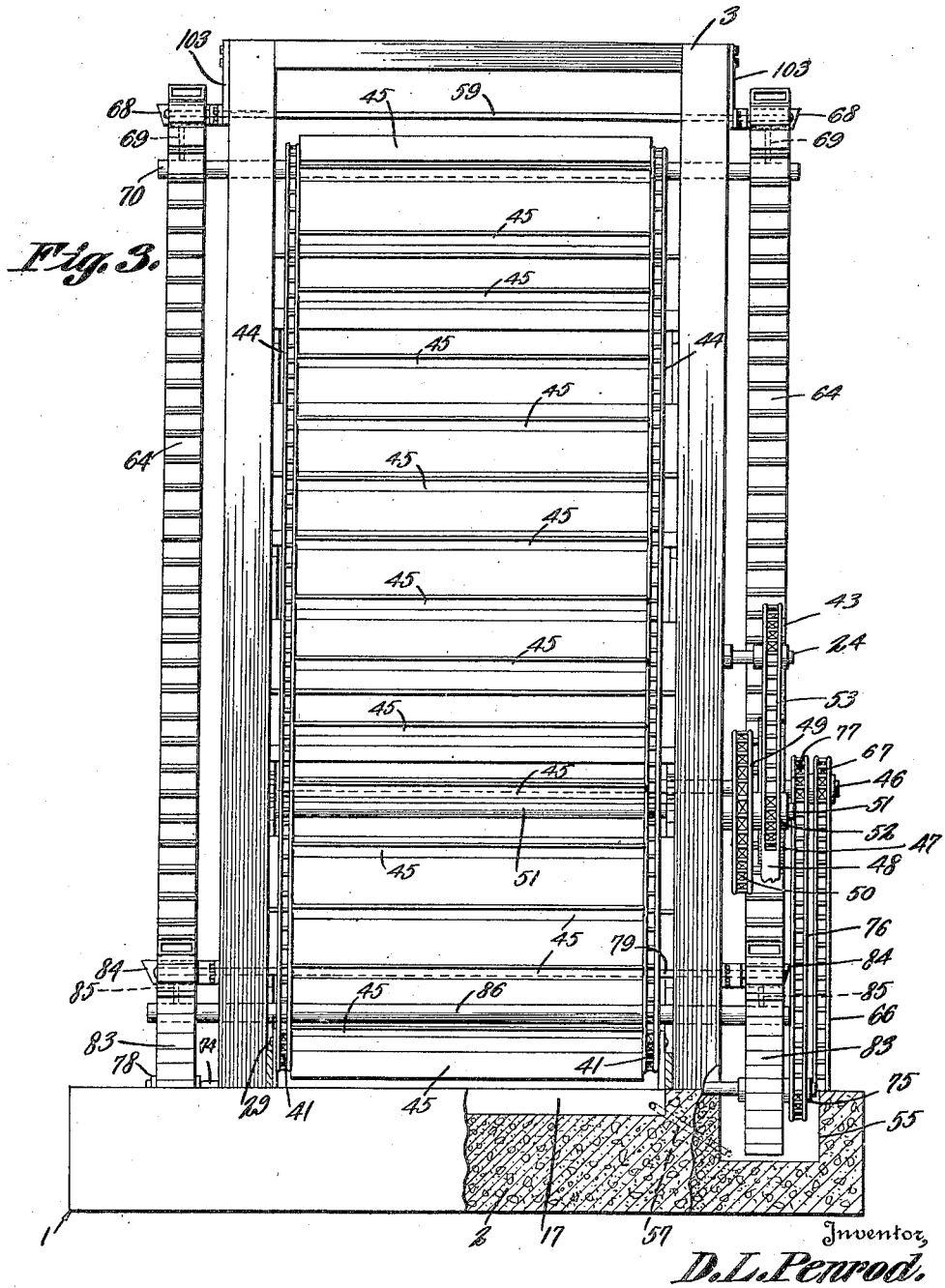

1,464,293

UNITED STATES PATENT OFFICE.

DAVID L. PENROD, OF HOOPER, UTAH.

AMALGAMATING MILL.

Application filed April 28, 1922. Serial No. 557,167.

*To all whom it may concern:*

Be it known that I, DAVID L. PENROD, a citizen of the United States, residing at Hooper, in the county of Weber and State of Utah, have invented a new and useful Amalgamating Mill, of which the following is a specification.

This invention aims to provide novel means for amalgamating metals, the construction being such that the metals will be subjected thoroughly to the amalgamating substance, novel means being provided for conveying the amalgamating substance from the bottom of the structure to the top thereof.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, an apparatus constructed in accordance with the invention, parts being in section; Figure 2 is a vertical longitudinal section; Figure 3 is an end elevation, parts being broken away; Figure 4 is a section showing one of the receptacles and attendant parts; Figure 5 is a section on the line 5—5 of Figure 1; Figure 6 is an elevation showing the distributor; and Figure 7 is an elevation showing a modified form of distributor.

In carrying out the invention there is provided a support, denoted generally by the numeral 1, and including a base 2 and a frame 3 on the base. The numeral 4 marks a baffle carried by brackets 100 on the frame 3, the baffle 4 discharging into a baffle 5, the baffle 5 discharging into a baffle 6. The baffle 6 discharges into a baffle 7, the baffle 7 discharging into a baffle 8, the baffle 8 communicating with a baffle 9 which, in its turn, discharges into a baffle 10, the baffle 10 discharging into a baffle 11 communicating with a baffle 12, the several baffles being downwardly inclined and being supported on the frame 3. The baffles 5, 6, 7, 8, 9, 10, 11 and 12 are closed at one end, as shown at 14, and each baffle has an inclined lip 15 discharging upon the baffle next therebeneath. The crushed ore is delivered to the baffle 4 through a chute 16 mounted on the frame 3. The baffle 12 discharges into a basin 17 formed in the base 2, or constructed otherwise, the basin having an incline 18.

A shaft 19 is journaled on the frame 3 at the intake end of the baffle 4, a shaft 20 being journaled on the baffle 4 at the discharge end thereof. A shaft 21 is journaled on the frame 3 and is located at the discharge end of the baffle 5. A shaft 22, similarly supported, is located at the discharge end of the baffle 6. A shaft 23 is journaled on the frame 3 and is located at the discharge end of the baffle 7. At the discharge end of the baffle 8 there is a shaft 24. A shaft 25 is disposed at the discharge end of the baffle 9. A shaft 26, journaled on the frame 3 is located at the discharge end of the baffle 10. A shaft 27, likewise journaled on the frame, is located at the discharge end of the baffle 11. At the discharge end of the baffle 12, there is a shaft 28, journaled on the frame 3. A shaft 29 is journaled on the frame 3 and is disposed at the outer end of the basin 17. A shaft 30 is journaled on the upper portion of the frame 3, in approximate horizontal alinement with the shaft 19. The shafts 19, 20, 21, 22, 23, 24, 25, 26, 27 and 28 carry respectively, sprocket wheels 31, 32, 33, 34, 35, 36, 37, 38, and 39. Sprocket wheels 41 are mounted on the shaft 29. The shaft 30 carries sprocket wheels 42. A sprocket wheel 43 is located externally of the frame 3, as shown in Figure 1 and is mounted on the shaft 24. A conveyor is provided, including chains 44 and blades 45 projecting both upwardly and downwardly from the chains. The said conveyor is adapted to move along the bottoms of the baffles 4, 5, 6, 7, 8, 9, 11 and 12 and is carried by the sprocket wheels 31, 32, 33, 34, 35, 36, 37, 38, 39, 40, 41 and 42.

The power shaft 46 is journaled on the baffle 10 or on any accessible portion of the frame 3 and carries a pulley 47 or other suitable means for driving the shaft, the pulley 47 being engaged by a belt 48. There is a sprocket wheel 101 on the shaft 46, the sprocket wheel 101 driving a sprocket chain 49 engaged about the sprocket wheel 50 on a shaft 51 journaled on the baffle 10 or on any accessible portion of the frame 3. The shaft 51 carries a sprocket wheel 52 engaged by a sprocket chain 53 cooperating with the sprocket wheel 43 on the shaft 24. It will be obvious that the conveyor 44—45 is actuated from the power shaft 46 by a train including the sprocket wheel 101, the sprocket chain 49, the sprocket wheel 50, the sprocket wheel 52, the chain 53, the sprocket wheel 43, the shaft 24 and the sprocket wheel 36.

First tanks 54 are formed in the base 2 or are constructed otherwise. The numeral 55 designates second tanks located in advance of the first tanks 54. The tanks 54 and 55 are connected by conduits 56. Conduits 57 lead from the basin 17 to the tanks 55. A shaft 58 is journaled on the frame 3 above the tank 54. Shafts 59 and 60 are journaled on the upper portion of the frame 3. The shaft 58 has sprocket wheels 61 and there are sprocket wheels 62 on the shafts 59 and 60. Conveyors 63 are engaged with the sprocket wheels 61 and 62 and include buckets 64 adapted to dip in the first tank 54. A sprocket wheel 65 is mounted on the shaft 58 and is engaged by a sprocket chain 66 cooperating with a sprocket wheel 67 on the power shaft 46. The conveyors 63, therefore, are driven from the power shaft 46 by the sprocket wheel 67, the chain 66, the sprocket wheel 65, the shaft 58 and the sprocket wheels 61.

Upper receptacles 68 are located outwardly of the frame 3 at each side thereof, the receptacles 68 being provided with depending outlet tubes 69 connected to a distributor 70, which may have an elongated slot 71 discharging into the uppermost baffle 4. The receptacles 68 are supported on brackets 103 mounted on the upper portion of the frame 3. If desired, the distributor 72 of Figure 7 may be substituted for the distributor 70 of Figure 6, the distributor 72 being provided with spaced perforations 73. The distributors 70 and 72 are of tubular form.

A shaft 74 is journaled on the base 4 and is located above the second tank 55. The shaft 74 carries a sprocket wheel 75 engaged by a chain 76 cooperating with a sprocket wheel 77 on the power shaft 46. The shaft 74 is provided with sprocket wheels 78. Shafts 79 and 80 are journaled on the frame 3 and are located above the baffle 12. The shafts 79 and 80 are provided with sprocket wheels 81. About the sprocket wheels 81 and 78 is trained a conveyor 82 having buckets 83 adapted to dip into the second tanks 55. Lower receptacle 84, constructed like the upper receptacles 68 is located at the sides of the frame 3 and are provided with outlet tubes 85, connected to a transverse tubular distributor 86 discharging into the baffle 12 constructed like the distributor 72.

In practical operation, the crushed ore is delivered into the baffle 4 through the chute 16, and, moves downwardly along the baffles 5, 6, 7, 8, 9, 10, 11 and 12, into the basin 17, under the impulse imparted to the ore by the conveyor 44—45. Since the blades 45 of the conveyor project both upwardly and downwardly with respect to the chains 44 the lower edge of each blade 45 advances the ore along one baffle, say the baffle 4, and, then, when the ore is in another baffle, say the baffle 5, the conveyor is inverted, and what were formerly the upper edges of the blades 45 now advance the ore. The crushed ore is drawn out of the basin 17 by that portion of the conveyor 44—45 which moves between the sprocket wheels 41 and the sprocket wheel 40.

The buckets 64 on the conveyor 63 scoop the amalgamating substance, generally mercury, out of the tanks 54, and carry the mercury upwardly, the mercury being discharged from the buckets 64 into the upper receptacles 68. From the upper receptacles 68, the mercury traverses the outlets 69 and moves into the distributor 70, the mercury passing from the distributor upon the ore which is moving along the uppermost baffle 4. Obviously, by the time that the ore has moved downwardly along the baffle, the ore, or more specifically, the particles of gold or other metal which have been pressed out of the ore, will be mingled thoroughly with the mercury.

The buckets 83 dip the mercury out of the second tank 55 and carry it upwardly, and discharge it into the lower receptacles 84, the mercury passing from the receptacles 84 through the outlet tubes 85 into the distributor 86, an additional charge of mercury being delivered upon the metal, just as the metal is moving out of the lowermost baffle 12. The surplus mercury, if any, flowing from the baffle 12, moves into the basin 17 and settles to the bottom of the basin. Since the bottom of the basin 17 is downwardly and rearwardly inclined, as shown at 18, the mercury flows through the conduits 57 back into the second tanks 55, and from the second tanks 55, the mercury flows to the first tanks 54 through the conduits 56.

What is claimed is:—

1. In a device of the class described, a frame; a basin located at the lower end of the frame arranged in zig-zag relation; superposed inclined baffles on the frame, the lowermost baffle discharging into the basin; a conveyor mounted on the frame and traversing the baffles; a distributor disposed above the uppermost baffle; a receptacle at the lower end of the frame and communicating with the basin; and means for elevating the contents of the receptacle and discharging the same into the distributor.

2. In a device of the class described, a frame; a receiving means at the lower end of the frame; a basin at the lower end of the frame and communicating with the receiving means; superposed inclined baffles on the frame, one baffle opening in one direction and the next in the opposite direction, the lowermost baffle discharging into the basin; a conveyor mounted on the frame and traversing the baffles and the basin; a distributor discharging into the uppermost baffle; a distributor discharging into the lowermost baffle; and means for elevating the contents of the receiving means and discharging the same into the distributors.

3. In a device of the class described, a frame; a receiving means located adjacent to the bottom of the frame; superposed inclined baffles on the frame; a conveyor mounted on the frame and traversing the baffles; a distributor discharging into the uppermost baffle; a distributor discharging into the lowermost baffle; bucket conveyors mounted on the frame and cooperating with the receiving means; means for receiving the contents of the bucket conveyors and discharging the same into the distributors; and mechanism for connecting the bucket conveyors and the first specified conveyor for simultaneous operation.

In testimony that I claim the foregoing as my own, I have hereto affixed my signature in the presence of two witnesses.

DAVID L. PENROD.

Witnesses:
   Geo. McCloy,
   T. R. Widdison.